United States Patent [19]

Kawai et al.

[11] 4,363,210

[45] Dec. 14, 1982

[54] EXHAUST GAS PURIFYING SYSTEM FOR INTERNAL COMBUSTION ENGINES

[75] Inventors: Hisasi Kawai, Toyohashi; Kazuhiro Sakurai, Susono; Muneaki Matsumoto, Okazaki, all of Japan

[73] Assignees: Nippon Soken, Inc., Nishio; Toyota Jidosha Kogyo Kabushiki Kaisha, Toyota, both of Japan

[21] Appl. No.: 271,224

[22] Filed: Jun. 8, 1981

Related U.S. Application Data

[63] Continuation of Ser. No. 62,147, Jul. 30, 1979, abandoned.

[30] Foreign Application Priority Data

Aug. 2, 1978 [JP] Japan ................................. 53-94419

[51] Int. Cl.³ ............................................... F01N 3/22
[52] U.S. Cl. ........................................ 60/276; 60/289; 123/589; 251/129
[58] Field of Search ................... 60/276, 289; 123/438, 123/440, 489, 585, 589, 487; 251/129, 133, 141, 324, 340; 137/93

[56] References Cited

U.S. PATENT DOCUMENTS

| | | | |
|---|---|---|---|
| 2,562,524 | 7/1951 | Burnum | 251/324 |
| 3,410,293 | 11/1968 | Ernyei | 137/93 |
| 3,588,039 | 6/1971 | Chelminski | 251/129 |
| 3,605,775 | 9/1971 | Zaander | 137/93 |
| 3,688,495 | 9/1972 | Fehler | 251/141 |
| 3,759,232 | 9/1973 | Wahl | 60/276 |
| 3,875,907 | 4/1975 | Wessel | 60/276 |
| 3,895,611 | 7/1975 | Endo | 123/487 |
| 4,102,126 | 7/1978 | Miyagi | 60/289 |
| 4,129,105 | 12/1978 | Ito | 123/440 |
| 4,150,643 | 4/1979 | Sasayama | 60/276 |
| 4,201,169 | 5/1980 | Michassouridis | 123/339 |

FOREIGN PATENT DOCUMENTS

1213841 11/1959 France ................................ 251/324

Primary Examiner—Douglas Hart
Attorney, Agent, or Firm—Cushman, Darby & Cushman

[57] ABSTRACT

An exhaust gas purifying system for internal combustion engines includes a three-way catalyst disposed in the exhaust system of the engine, and secondary air is supplied to the exhaust system through an air control valve under the control of an air-fuel ratio control circuit. The air-fuel ratio control circuit produces a control signal which increases or decreases stepwise at every reception of a clock signal depending on whether the air-fuel ratio in the exhaust system is above or below a stoichiometric air-fuel ratio. The air control valve is of the proportional electromagnetic type and controls the secondary air passing therethrough in proportion to the control signal.

2 Claims, 3 Drawing Figures

EXHAUST GAS PURIFYING SYSTEM FOR INTERNAL COMBUSTION ENGINES

This is a continuation of application Ser. No. 62,147 filed July 30, 1979, now abandoned.

BACKGROUND OF THE INVENTION

The present invention relates to an exhaust gas purifying system in which the amount of the secondary air supplied to the exhaust gas system of the internal combustion engine is regulated in accordance with the output signal of an air-fuel ratio detector so that the exhaust gas is purified by a three-way catalyst.

In the conventional systems of this type, in view of the fact that the three-way catalyst displays the optimum purifying ability at or about a predetermined (stoichiometric) air-fuel ratio, the air-fuel ratio in the exhaust system after mixture of the exhaust gas and the secondary air is detected by an air-fuel ratio detector and the amount of the secondary air to be supplied is controlled by feedback by an air control valve in such a manner that the air-fuel ratio in the exhaust system reaches a predetermined value.

The air pump making up a source of the secondary air is driven by the engine. Even though the displacement, i.e., the opening of the air control valve is controlled, the variation in the output of the air pump causes a change in the amount of the secondary air, thereby making it impossible to control the air-fuel ratio accurately. In order to obviate this problem, a system has been proposed in which a pressure regulator means is provided for adjusting the differential pressure between the upstream and the downstream of the air control valve at a predetermined value not related to the output of the air pump. Such a system still has a problem unsolved. Even though the opening of the air control valve is controlled by the output signal of the air-fuel ratio detector, the delay time for the secondary air to reach the air-fuel ratio detector and detection delay time of the air-fuel ratio detector itself are required before the air-fuel ratio in the exhaust system, i.e., the amount of secondary air changes upon actuation of the air-fuel control valve and the change is detected and an output signal is produced by the air-fuel ratio detector. As a result, the problem of the system controlling the air control valve constantly is that the range of variation in the air-fuel ratio is undesirably great.

SUMMARY OF THE INVENTION

The present invention has been developed in order to obviate the above-mentioned problem, and an object thereof is to provide an exhaust gas purifying system comprising an air-fuel ratio control circuit for determining at predetermined periods whether the air-fuel ratio is higher or lower than a predetermined ratio in response to an output signal of the air-fuel ratio detector, the air-fuel ratio control circuit producing a control signal by adding a predetermined value to or subtracting it from the previous value in response to the determination signal at the predetermined periods so that the air control valve is displaced by this control signal. The hunting caused by the reaction delay of the air-fuel detector or the operation delay in the tube system is thus decreased. Also, the amount of air is controlled in step but continually, thus making possible the control of the air-fuel ratio with high response and accuracy. In this way, the great change in the air-fuel ratio in the exhaust system which is caused by the delay time in the control system or the like is reduced and therefore the three-way catalyst functions effectively, thereby purifying the exhaust gas in an optimum way.

DESCRIPTION OF THE PREFERRED EMBODIMENTS

Figure 1:
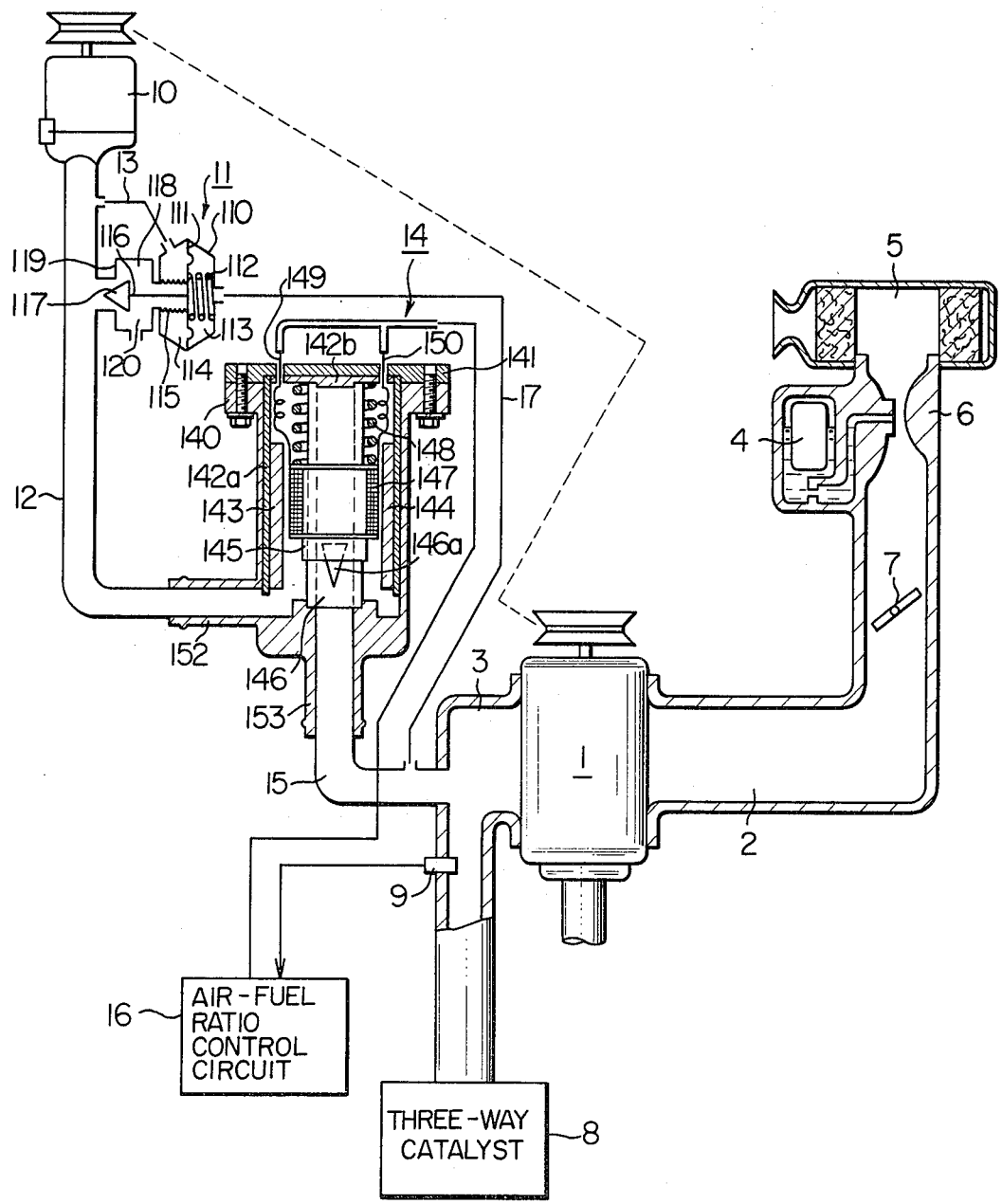
FIG. 1 is a schematic diagram showing a construction of an embodiment of the present invention.
Figure 2:
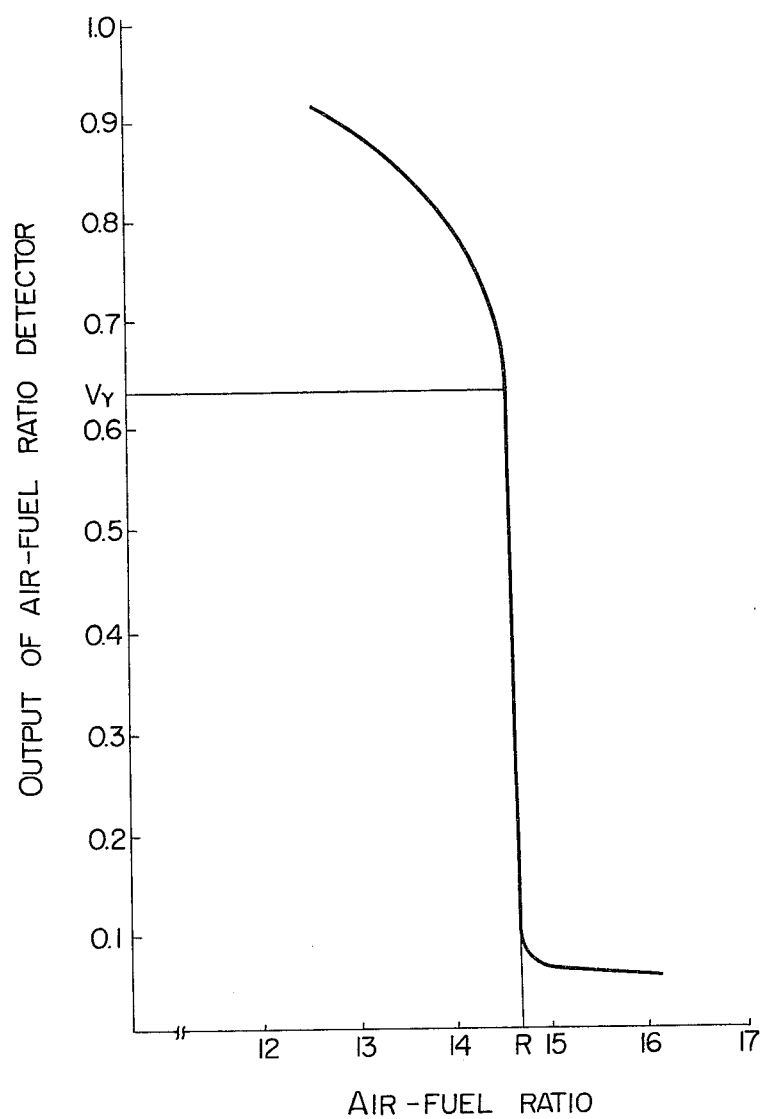
FIG. 2 shows output characteristics of an air-fuel ratio detector shown in FIG. 1.

In FIG. 1, reference numeral 1 shows an internal combustion engine, numeral 2 an intake manifold, and numeral 3 an exhaust manifold. The intake manifold 2 is provided with a carburetor 4 for supplying a mixture gas to the engine 1. The carburetor 4 has a venturi 6 and a throttle valve 7. Numeral 5 shows an air cleaner for cleaning the air taken into the engine 1. Numeral 9 shows a well-known air-fuel ratio detector mounted in the exhaust manifold 3 for detecting the air-fuel ratio from the oxygen concentration in the exhaust gas and producing an output corresponding to the air-fuel ratio as shown in FIG. 2. A three-way catalyst is provided downstream of the air-fuel ratio detector 9. As well known, the three-way catalyst 8 promotes the reduction and oxidization of CO, HC and NOx contained in the exhaust gas flowing into the three-way catalyst, thereby purifying the polluting components thereof. Especially when the air-fuel ratio in the engine exhaust system is at or about a predetermined (stoichiometric) level of 14.7, CO, HC and NOx are all purified most efficiently. Numeral 10 shows an air pump driven by the engine 1 for supplying air. Numeral 11 shows a relief valve making up pressure regulating means arranged in the midst of the supply tube 12 leading the air produced from the air pump to the inlet of the air control valve 14. The relief valve 11 thus regulates the pressure in the supply tube path 12. The diaphragm chamber 114 of this relief valve 11 is connected through a tube path 13 to the tube path 12, while the other diaphragm chamber 113 is connected through the tube 17 to the tube path 15 downstream of the air control valve 14. The relief valve 11 has a function to maintain the pressure difference between the tube paths 12 and 15 constant. The air control valve 14 with the inlet connected to the tube path 12 and the outlet to an end of the tube path 15 is of a proportional electromagnetic actuation type having a spool displaced continuously in proportion to the control signal of the air-fuel ratio control circuit 16 described later. The amount of the secondary air is thus controlled in proportion to the control signal. The other end of the tube path 15 is connected to the exhaust tube 3. On the basis of the output signal of the air-fuel ratio detector 9, the air-fuel ratio control circuit 16 determines whether the air-fuel ratio is higher or lower than a predetermined (stoichiometric) value at predetermined time intervals, produces a control signal by adding a predetermined value to or subtracting it from the previous value in response to the determination signal, and regulates the opening, i.e., the displacement of the air control valve 14 in accordance with the control signal.

The construction and functions of the relief valve 11 will be described in detail below. The pressure in the tube path 12 and the tube path 13 are led to the diaphragm chambers 114 and 113 of the relief valve 11. In accordance with the differential pressure between the diaphragm chambers 114 and 113, the diaphragm 111 is displaced so that the air in the tube path 12 is expelled into the atmosphere by the valve body 117 and the valve seat 119. In the drawing under consideration, numeral 110 shows a housing, numeral 112 a spring, numeral 115 a bellowsphragm, numeral 116 a shaft and numeral 120 a pressure chamber opened to the atmosphere. The spring 112 exerts a force in such a manner that the diaphragm 111 is held at the left side in the drawing, i.e., the valve body 117 is closed. The shaft 116 connects the diaphragm 111 with the valve body 117. The first diaphragm chamber 113 has the same pressure-receiving area as the second diaphragm chamber 114. Assume that a positive pressure in the absolute value of P2 acts on the first diaphragm chamber 113, a positive pressure in the absolute value of P1 on the second diaphragm chamber 114, and the first and second diaphragm chambers 113 and 114 have the pressure-receiving area A. The force W exerted rightward of the diaphragm 111, i.e., in the direction to open the valve body 117 is expressed as $$W = (P1 - P2) \times A$$

If the pressure P1 in the tube path 12 on the pump side is increased, the diaphragm 111 moves rightward. The valve body 117 moves in the direction to open. As a result, the opening area of the valve body 117 and the valve seat 119 is increased, so that the amount of air in the tube path that is expelled into the atmosphere through the pressure chamber 120 is increased. The pressure in the tube path 12, i.e., the pressure P1 in the second diaphragm chamber 114 decreases to a level where the force W is balanced with the force F of the spring 112, thus maintaining the pressure difference between P1 and P2 constant. The pressure difference is also maintained constant when the pressure P1 is reduced.

The construction and functions of the air control valve 14 will be described in detail. Numerals 140 and 141 show housings securely fixed to each other by screws. Numeral 142a shows a tubular support made of a magnetic material secured to the housing 140, and numeral 142b a disc-shaped support made of a magnetic material secured to the housing 141. A pair of circular-arc-shaped permanent magnets 143 and 144 with opposed inside parts thereof magnetized to N polarity respectively and outside parts thereof to S polarity are bonded to the housing 140 by a bonding agent. Numeral 145 shows a spool adapted to move vertically on the outer periphery of the cylindrical shaft 146 fixed on the housing 141. The spool 145 is wound with a coil 147. Numeral 148 shows a spring for urging the spool 145 downward. Numeral 149 shows a lead wire at the starting end of the coil 147, and numeral 150 a lead wire at the tail end of the coil 147. Both lead wires 149 and 150 are connected to the output terminal of the air-fuel ratio control circuit 16. A slit 146a in the form of equilateral triangle is bored at two points on both sides of the cylindrical shaft 146 as shown in the drawing. With the movement of the spool 145 over the shaft 146, the spool 145 changes the opening of the slit 146a thereby to control the amount of air flowing from the inlet pipe 152 connected to the tube 12 to the outlet pipe 153 connected to the tube 15. The amount of displacement, i.e., the amount of movement of the spool 145 is proportional to the square root of the opening area of the slit 146a.

Operation of this system having the above-mentioned construction will be explained. Assume that the circular-arc-shaped permanent magnets 143 and 144 have inside parts thereof magnetized at N pole and outside parts magnetized at S pole. The magnetic fluxes pass from the inside N pole of the permanent magnet 143 through the shaft 146, the supports 142b and 142a to the outside S pole of the permanent magnet 143. In similar fashion, a magnetic path is formed from the inside of the permanent magnet 144 through the shaft 146, the supports 142b and 142a and the outside part of the permanent magnet 144. Thus a magnetic field with parallel magnetic fluxes is formed from the inside parts of the permanent magnets 143 and 144 toward the center of the shaft 146. When current flows in the coil 147 placed in this magnetic field, an electromagnetic force is exerted on the coil 147 upward in the drawing according to Fleming's rule. Thus the spool 145 moves upward until it stops at a position balanced with the force of the spring 148. The electromagnetic force is proportional to the number of turns N of the coil 147 and the current i flowing in the coil. Since the number of turns N is constant, the electromagnetic force is proportional to the current flowing in the coil 147. On the other hand, the force of the spring 148 is the product of the amount of movement and the spring constant. Therefore, the current flowing in the lead wires 149 and 150 is proportional to the amount of movement of the spool 145. The amount of movement is proportional to the square root of the opening area of the slit of the shaft 146, and therefore the current supply is proportional to the square root of the opening area of the slit. Also, in the event that the difference between the pressure in the tube 12 and that in the tube 15 is constant, it has been experimentally confirmed that the air flow rate at the outlet of the air control valve 14 is substantially proportional to the square root of the opening area of the slit. This pressure difference is maintained constant by the relief valve 11 is described above, with the result that the flow rate of the air is controlled in proportion to the current supplied to the air control valve 14.

Figure 3:
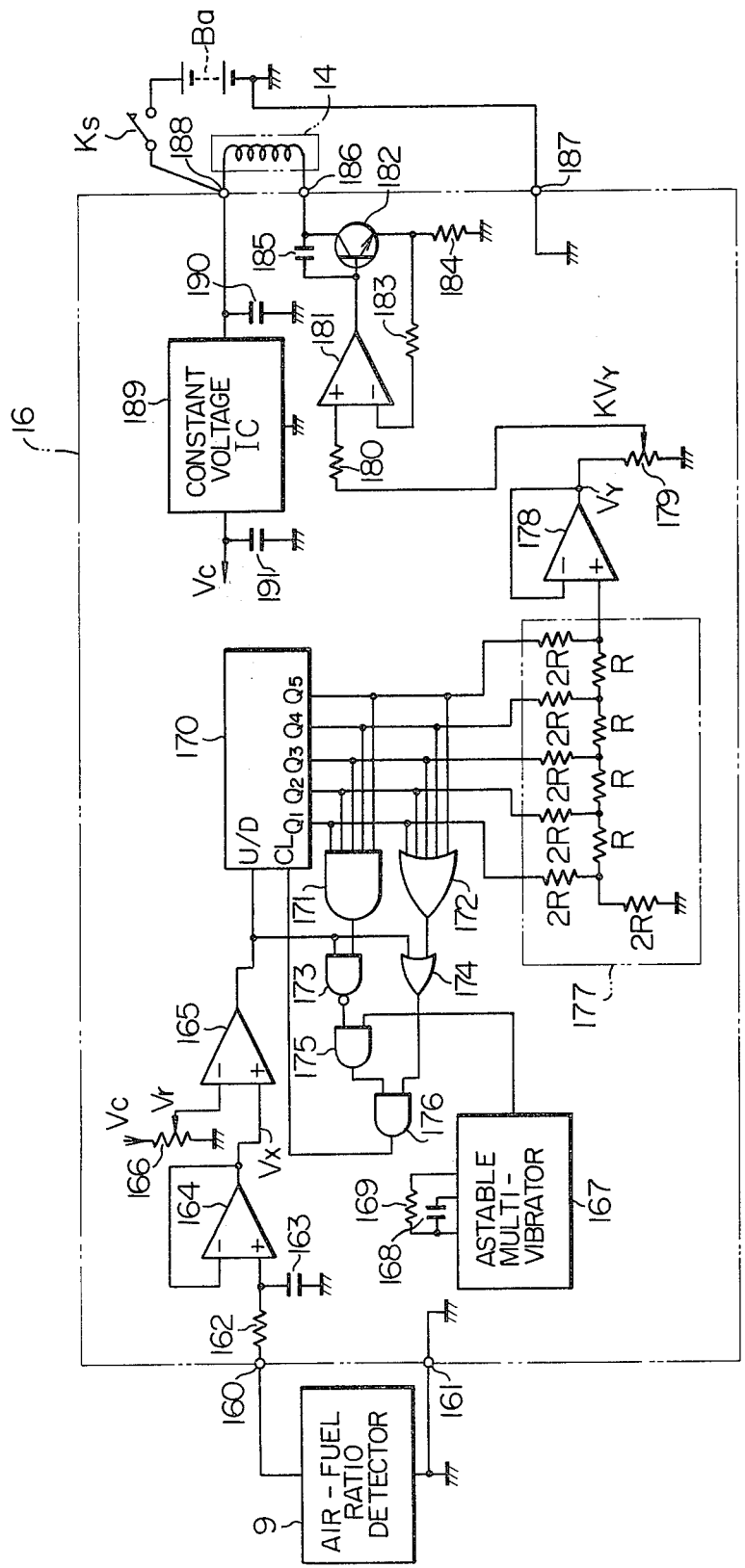
FIG. 3 is an electrical circuit diagram of an air-fuel ratio control circuit shown in FIG. 1.

Next, the air-fuel ratio control circuit 16 will be explained in detail with reference to FIG. 3. In FIG. 3, the input terminal 160 is connected to the output terminal of the air-fuel ratio detector 9, and the other input terminal 161 to the earth-side terminal of the air-fuel ratio detector 9. The lead wire from the air-fuel ratio detector 9 takes the form of a shield wire. The input terminal 160 is connected to the non-inverting input of the buffer amplifier 164 through the resistor 162. A capacitor 163 for absorbing noises is inserted between the non-inverting input and the earth terminal. The input terminal 161 is grounded. The buffer amplifier 164 is the IC CA3130 of RCA. The inverting input terminal of the buffer amplifier 164 is connected to the output terminal thereof. The output terminal is in turn connected to the non-inverting input terminal of the comparator 165. The inverting input terminal of the comparator 165 is connected to the variable terminal of the variable resistor 166. The output terminal of the comparator 165 is connected to the U/D input terminal of the up-down counter 170. One of the fixed terminals of the variable resistor 166 is impressed with a constant voltage Vc, and the other fixed terminal thereof grounded. Numeral 167 shows an astable multivibrator which is in this case the IC CD4047 of RCA. Among the terminals of the IC, the terminals 4, 5, 6 and 14 (not shown) are impressed with the constant voltage Vc, and the terminals 7, 8, 9 and 12 (not shown) are grounded, thereby providing the functions of the astable multivibrator. The capacitor 168 is connected to the terminals 3 and 1, and the resistor 169 to the terminals 3 and 2. The oscillation frequency is determined by the time constant of the capacitor 168 and the resistor 169. The output of the astable multivibrator 167 is connected to the inputs of the AND gates 175 and 176. The up-down counter 170 includes two ICs 4029 of RCA thus making up a binary up-down counter. The clock input terminal CL is connected to the output terminal of the AND gate 176. The output terminals Q1, Q2, Q4 and Q5 are connected to the R-2R ladder network circuit 177 in ascending order from the lower order of digits. The input terminals of the 5-input AND gate 171 are connected to the output terminals Q1, Q2, Q3 and Q4 and Q5 of the up-down counter 170 respectively. One of the input terminals of the NAND gate 173 is connected to the output terminal of the comparator 165, and the other input terminal thereof to the output terminal of the AND gate 171. The output terminal of the NAND gate 173 is connected to the other input terminal of the AND gate 175. One of the input terminals of the OR gate 174 is connected to the output terminal of the comparator 165, and the other input terminal thereof to the OR gate 172. The output terminal of the OR gate 174 is connected to one terminal of the AND gate 176. The output terminal of the AND gate 175 is connected to the other input terminal of the AND gate 176. The output terminal of the AND gate 176 is connected to the clock input terminal CL of the up-down counter 170 as mentioned above. The output terminal of the R-2R ladder network 177 is connected to the non-inverting input terminal of the buffer amplifier 178. The inverting input terminal of the buffer amplifier 178 is connected to the output terminal thereof. The output terminal of the buffer amplifier 178 is connected to one fixed terminal of the variable resistor 179. The other fixed terminal of the variable resistor 179 is grounded, and the variable terminal thereof is connected through the resistor 180 to the non-inverting input terminal of the amplifier 181. The output terminal of the amplifier 181 is connected to the base of the transistor 182, and the inverting input terminal thereof to the emitter of the transistor 182 through the resistor 183. The emitter of the transistor 182 is connected to an end of the resistor 184. The other end of the resistor 184 is grounded. The capacitor 185 is inserted between the base and collector of the transistor 182. The collector of the transistor 182 is connected through the output terminal 186 of the control circuit 16 to an end of the solenoid 147 of the air control valve 14. The power input terminal 187 is connected to the negative electrode of the battery Ba on the one hand and grounded on the other hand. The other power input terminal 188 is connected through an automotive key switch KS to the positive electrode of the battery Ba. The power input terminal is also connected to the input terminal of the constant-voltage IC 189. The constant-voltage IC 189 is the IC MC7806 of Motorola which produces a constant voltage Vc. The capacitor 191 is connected between the input terminal and the earth terminal of the IC 189, and the capacitor 191 is inserted between the output terminal and the earth terminal thereof for removing the noises.

The operation of the air-fuel ratio control circuit 16 will be explained. The configuration including the resistor 162, the capacitor 163 and the buffer amplifier 164 makes it possible to produce a comparatively large current from a small current or to reduce, the high input impedance to a low impedance. The comparator 165 compares the output voltage Vx of the buffer amplifier 164 with the set voltage Vr of the variable terminal of the variable resistor 166. When Vx is equal to or larger than Vr, i.e., when the air-fuel ratio is equal to or higher than a predetermined level, a high level voltage signal "1" is produced. When Vx is smaller than Vr, in contrast, a low-level voltage signal "0" is produced. The voltage Vx is equal to the output voltage of the air-fuel ratio detector 9 and has the characteristics identical to those shown in FIG. 2. When the output of the comparator 165 is in "1" state, the up-down counter 170 counts up; while the output of the comparator 165 is "0," it counts down. The 5-input AND gate 171 is for preventing the overflow of the up-down counter 170. When all the outputs of the up-down counter 170 are "1," the AND gate 171 produces a "1" signal. When the U/D input is "1," the NAND gate 173 produces a "0" signal and therefore the output of the AND gate 175 becomes "0," thereby stopping the clock signal from the oscillator 167. The 5-input OR gate 172, on the other hand, is for preventing the up-down counter 170 from counting down after all the outputs of the up-down counter 170 become "0." When all the outputs of the up-down counter 170 become "0," the output of the 5-input OR gate 172 becomes "0." Since the U/D input is "0," the OR gate 174 produces a "0" signal, so that the clock signal from the AND gate 175 is stopped at the AND gate 176. In other words, when all the outputs of the up-down counter 170 are "1" with the "1" U/D input or when all the outputs of the up-down counter 170 are "0" with the "0" U/D input, the clock input terminal CL is prevented from being impressed with the clock signal. In the other cases, the clock signal is applied to the clock input terminal. By the way, the oscillation frequency of the oscillator 167, i.e., the repetition frequency of the clock signal is approximately 10 Hz. Assume that the air-fuel ratio is lower than the predetermined level and the output of the comparator 165 is "1." In response to each clock pulse from the oscillator 167, the up-down counter 170 counts up by one. When the air-fuel ratio exceeds the predetermined level so that the comparator 165 produces a "0" signal, the up-down counter 170 begins to count down each clock pulse applied thereto. The ladder network 177 is a well-known D-A converter for converting the binary output of the up-down counter 170 into an analog voltage. The buffer amplifier 178 is for amplifying the output of the ladder network 177 and like the buffer amplifier 164, converts the high input impedance into a low impedance. The variable resistor 179 divides the output voltage Vr of the buffer amplifier 178 thereby to produce the voltage KVy. The resistors 180 and 184, the amplifier 181 and the transistor 182 makes up a constant current circuit. A constant output current corresponding to the input voltage KVy is produced as the collector current of the transistor 182 by the operation which is well known and therefore not explained here. The capacitor 185 is for absorbing the noises which might occur from the electromagnetic coil 147 making up a collector load of the transistor 182.

The operation of the above-mentioned system in general will be explained. Assume that the output voltage Vx of the air-fuel ratio detector 9 is higher than the set voltage Vr, i.e., that the air-fuel ratio in the exhaust system is smaller than the predetermined level. The comparator 165 produces a "1" signal so that the count of the up-down counter 170 increases at each period of the oscillator 167, i.e., at regular intervals of 0.1 second (10 Hz). Thus the output voltage Vy of the buffer amplifier 178 correspondingly increases in step. As a result, the voltage KVy at the inverting input terminal of the amplifier 181 also increases in step, so that the current flowing in the coil 147 of the air control valve 14 correspondingly increases. The opening area is proportionately increased by the spool 145 and the shaft 146. On the other hand, in view of the fact that the pressure difference between the input and output of the air control valve 14 is always maintained constant by the relief valve 11, the amount of the secondary air flowing through the air control valve 14 is proportional to the above-mentioned opening area. Therefore, the amount of the secondary air supplied to the exhaust tube 3 is increased and the air-fuel ratio approaches the predetermined level. Then the output voltage of the air-fuel ratio detector 9 is reduced and finally becomes lower than the set voltage Vr. The up-down counter 170 begins to count down, so that the output value thereof is reduced by one for each 0.1 second. The amount of the secondary air flowing through the air control valve 14 is thus reduced, resulting in a lower air-fuel ratio. In this way, the air-fuel ratio in the exhaust gas system is converged to a predetermined (stoichiometric) level.

It takes some time from the actuation of the air control valve 14 until the corresponding change in the amount of the secondary air causes a change in the air-fuel ratio to be detected by the air fuel ratio detector 9 and a detection output signal produced by the same. For this reason, it is necessary to hold the air control valve 14 during the delay time from the actuation of the air control valve in a certain mode to the detection and production of the change by the air-fuel ratio detector 9. In spite of this, according to this embodiment, the control output signal of the control circuit 16 is switched for each 0.1 second, i.e., at regular time intervals corresponding to the oscillation period of the oscillator 167 of the air-fuel ratio control circuit 16, thus posing no problem of a great change in the air-fuel ratio.

In the above-mentioned embodiment, the switching cycle of the control output signal of the control circuit 16 is determined by the constant oscillation period of the oscillator 167. In view of the fact that the velocity of the secondary air passing through the air control valve 14, i.e., the above-mentioned delay time is related to the rotational speed of the internal combustion engine, the oscillation signal of the oscillator 167 may be replaced with equal effect by a signal representing the engine rotational speed such as the signal synchronous with the ignition signal for the distributor or the like. Further, as the control circuit mentioned above, a control circuit using a microcomputer may be used under the same technical concept unlike in the above-mentioned embodiments. Furthermore, although the above-mentioned embodiments use the relief valve 11 as a pressure-adjusting means for regulating the pressure difference between upstream and downstream of the air control valve 14 at a fixed level, alternative mechanism is such that adjustment is made at a value corresponding to the amount of intake air of the engine or the intake negative pressure of the engine.

We claim:

1. An exhaust gas purifying system for internal combustion engines comprising:

air supply means for supplying secondary air to an exhaust gas system of an internal combustion engine, a three-way catalyst for purifying polluting components in the exhaust gas, an air-fuel ratio detector for detecting an air-fuel ratio from the component of the exhaust gas after being supplied with said secondary air, an air-fuel ratio control circuit for determining whether said air-fuel ratio is higher or lower than a predetermined level at every predetermined period of time determined by a clock signal from an oscillator in response to an output signal of said air-fuel ratio detector, and for producing a control signal increasing or decreasing stepwisely by adding a predetermined value to or subtracting it from a previous value in accordance with a determination signal at said every predetermined period of time, an air control valve having a spool adapted to be displaced continuously in proportion to said control signal of said air-fuel ratio control circuit by driving said spool by said stepwisely increasing or decreasing control signal thereby controlling the amount of the secondary air supplied to said exhaust gas system of said engine from said air supply means, and pressure regulating means for regulating at a predetermined value the pressure difference of said secondary air between the upstream and downstream of said air control valve through which said secondary air passes.

2. An exhaust gas purifying system for internal combustion engines comprising:

air supply means for supplying secondary air to an exhaust gas system of an internal combustion engine;

a three-way catalyst for purifying polluting components in the exhaust gas;

an air-fuel ratio detector for detecting an air-fuel ratio from the component of the exhaust gas after being supplied with said secondary air;

an air-fuel ratio control circuit for producing a control signal, said air-fuel ratio control circuit including comparison means (165) for determining whether said air-fuel ratio is higher or lower than a predetermined level at every predetermined period of time determined by a clock signal from an oscillator in response to an output signal of said air fuel ratio detector, counter means (170) for producing a binary output signal by adding a predetermined value to or subtracting it from a previous value in accordance with a determination signal at said every predetermined period of time, D-A converter means (177) for converting said binary output signal into an analog voltage signal varying stepwisely, constant current circuit means (180–184) for converting said analog voltage signal into an analog current signal varying stepwisely and for delivering said analog current signal as said control signal, and an air control valve having a spool adapted to be driven by said control signal stepwisely in accordance with each increment or decrement of said control signal and to be displaced substantially continuously in proportion to said control signal of said air-fuel ratio control circuit for controlling the amount of the secondary air supplied to said exhaust gas system of said engine from said air supply means.

* * * * *